US012457678B2

(12) United States Patent
Wandke et al.

(10) Patent No.: US 12,457,678 B2
(45) Date of Patent: Oct. 28, 2025

(54) PLASMA TREATMENT ARRANGEMENT AND METHOD FOR ADAPTING THE SIZE OF A SUPPORT AREA OF THE PLASMA TREATMENT ARRANGEMENT TO THE SIZE OF THE SURFACE TO BE TREATED

(71) Applicant: CINOGY GMBH, Duderstadt (DE)

(72) Inventors: Dirk Wandke, Heilbad Heiligenstadt (DE); Ronny Lettke, Duderstadt (DE)

(73) Assignee: CINOGY GMBH, Duderstadt (DE)

( * ) Notice: Subject to any disclaimer, the term of this patent is extended or adjusted under 35 U.S.C. 154(b) by 1139 days.

(21) Appl. No.: 17/423,199

(22) PCT Filed: Dec. 16, 2019

(86) PCT No.: PCT/DE2019/101096
§ 371 (c)(1),
(2) Date: Jan. 20, 2022

(87) PCT Pub. No.: WO2020/147880
PCT Pub. Date: Jul. 23, 2020

(65) Prior Publication Data
US 2022/0172929 A1 Jun. 2, 2022

(30) Foreign Application Priority Data
Jan. 16, 2019 (DE) .................... 10 2019 101 063.2

(51) Int. Cl.
*H01J 37/32* (2006.01)
*H05H 1/24* (2006.01)

(52) U.S. Cl.
CPC ....... *H05H 1/2406* (2013.01); *H05H 2245/34* (2021.05)

(58) Field of Classification Search
CPC ............. H05H 1/2406; H05H 2245/34; H05H 1/2439; H05H 1/2418; H05H 2245/30;
(Continued)

(56) References Cited

U.S. PATENT DOCUMENTS

| 9,330,890 B2 | 5/2016 | Busse et al. |
| 2014/0182879 A1 | 7/2014 | Busse |
| 2014/0200506 A1* | 7/2014 | Zemel ............... A61B 18/042 |
| | | 604/23 |
| 2015/0157870 A1 | 6/2015 | Kalghatgi |
| 2016/0193475 A1 | 7/2016 | Srb et al. |
| 2019/0184187 A1* | 6/2019 | Lee ...................... B01D 53/04 |

FOREIGN PATENT DOCUMENTS

| CN | 103153435 A | 6/2013 |
| CN | 103648584 A | 3/2014 |

(Continued)

*Primary Examiner* — Xiuyu Tai
(74) *Attorney, Agent, or Firm* — WCF IP

(57) ABSTRACT

In a plasma treatment arrangement for carrying out dielectrically impeded plasma discharge onto a surface to be treated having a flat electrode unit (4) which has a treatment side, and a control unit (11) which supplies at least one electrode (19) of the electrode unit (4) with a high-voltage AC potential for a power which is required for plasma generation between the at least one electrode (19) and a counterelectrode which forms a reference potential, wherein the at least one electrode (19) which receives the high-voltage AC potential is shielded with a flat dielectric (7), at least on the treatment side, and wherein the flat electrode unit is designed to reduce the size of its support area on the surface to be treated for the purpose of adaptation to the size of the surface to be treated, the adaptation of the support area of the flat electrode unit (4) becomes possible in an unproblematical manner on account of the control unit (11) having a device (14) for determining the size of the adapted support area and a control device for adjusting the power to be output to the at least one electrode (19) in accordance with the determined size of the support area.

11 Claims, 7 Drawing Sheets

(58) Field of Classification Search
CPC ........... H05H 2245/36; H05H 2245/40; H05H 2277/10; H05H 2277/14; H05H 2240/10; H05H 2240/20; A61B 18/042; A61B 2018/00452; A61B 2018/147; A61B 2218/003; A61B 2018/048; A61B 2018/00583; A61B 2218/008; A61B 2018/0047; A61B 18/082; A61N 1/0468; A61N 1/08; A61N 1/32; A61N 1/44; A61N 1/0408; B01D 53/04; B01D 2253/1124; B01D 39/20; B01D 2259/4533; B01D 2257/106; B01D 53/66; H01J 37/32844; H01J 37/32; H01J 37/32568; H01J 37/3244; Y02C 20/30; A61M 2205/054; A61M 2202/0216; A61M 2210/0606

See application file for complete search history.

(56) References Cited

FOREIGN PATENT DOCUMENTS

| | | |
|---|---|---|
| CN | 105009691 A | 10/2015 |
| CN | 106687147 A | 5/2017 |
| CN | 107926106 A | 4/2018 |
| DE | 10 2014 220 488 A1 | 4/2016 |
| DE | 10 2015 118 372 A1 | 6/2016 |
| DE | 10 2017 104 852 A1 | 9/2018 |
| DE | 10 2017 111 902 A1 | 12/2018 |
| DE | 10 2018 105 511 A1 | 9/2019 |
| EP | 2 723 447 B1 | 6/2012 |
| KR | 20160136551 A | 11/2016 |
| WO | 2016/183672 A1 | 11/2016 |
| WO | 2017016761 A1 | 2/2017 |
| WO | 2018/093261 A1 | 5/2018 |

\* cited by examiner

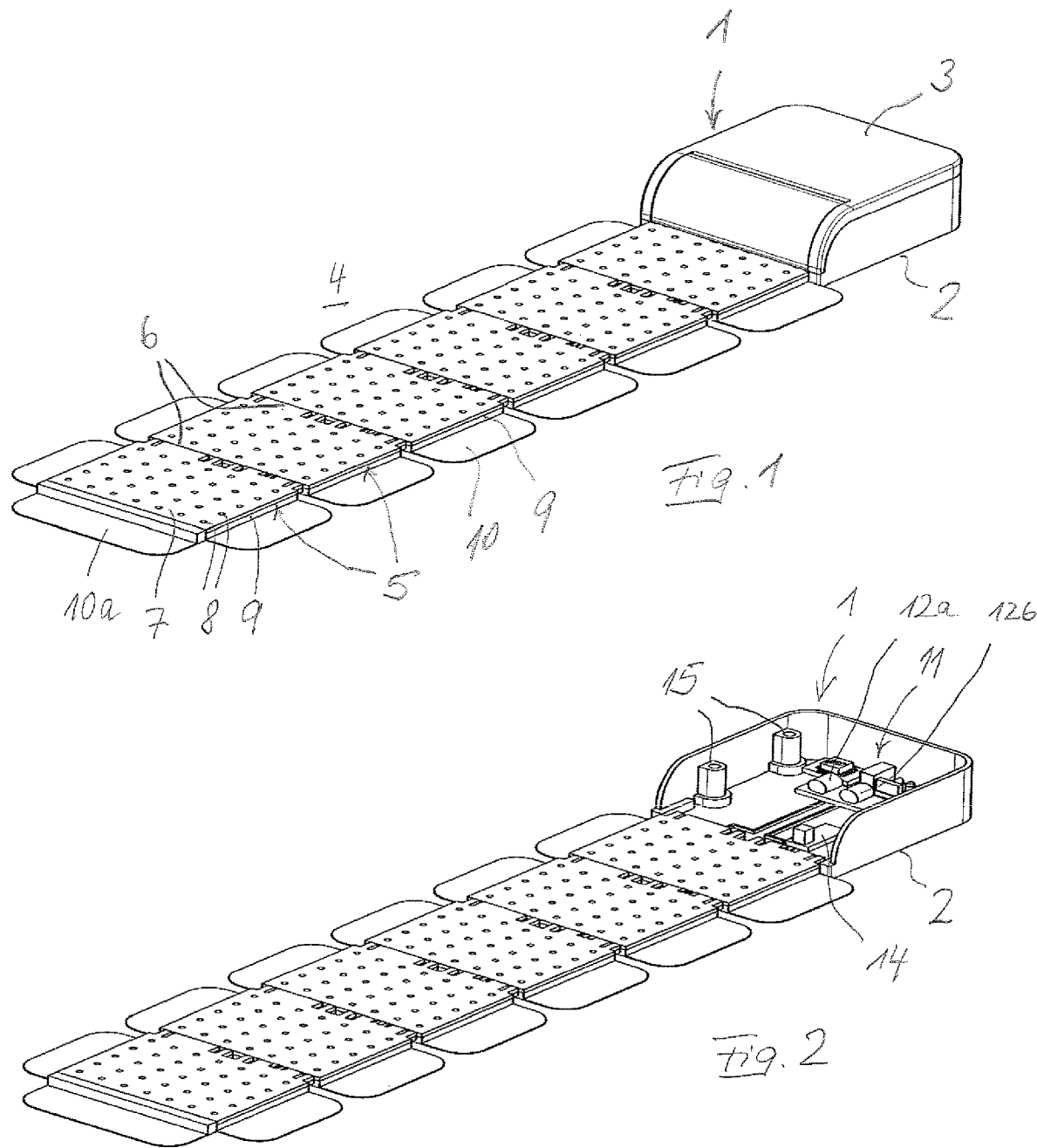

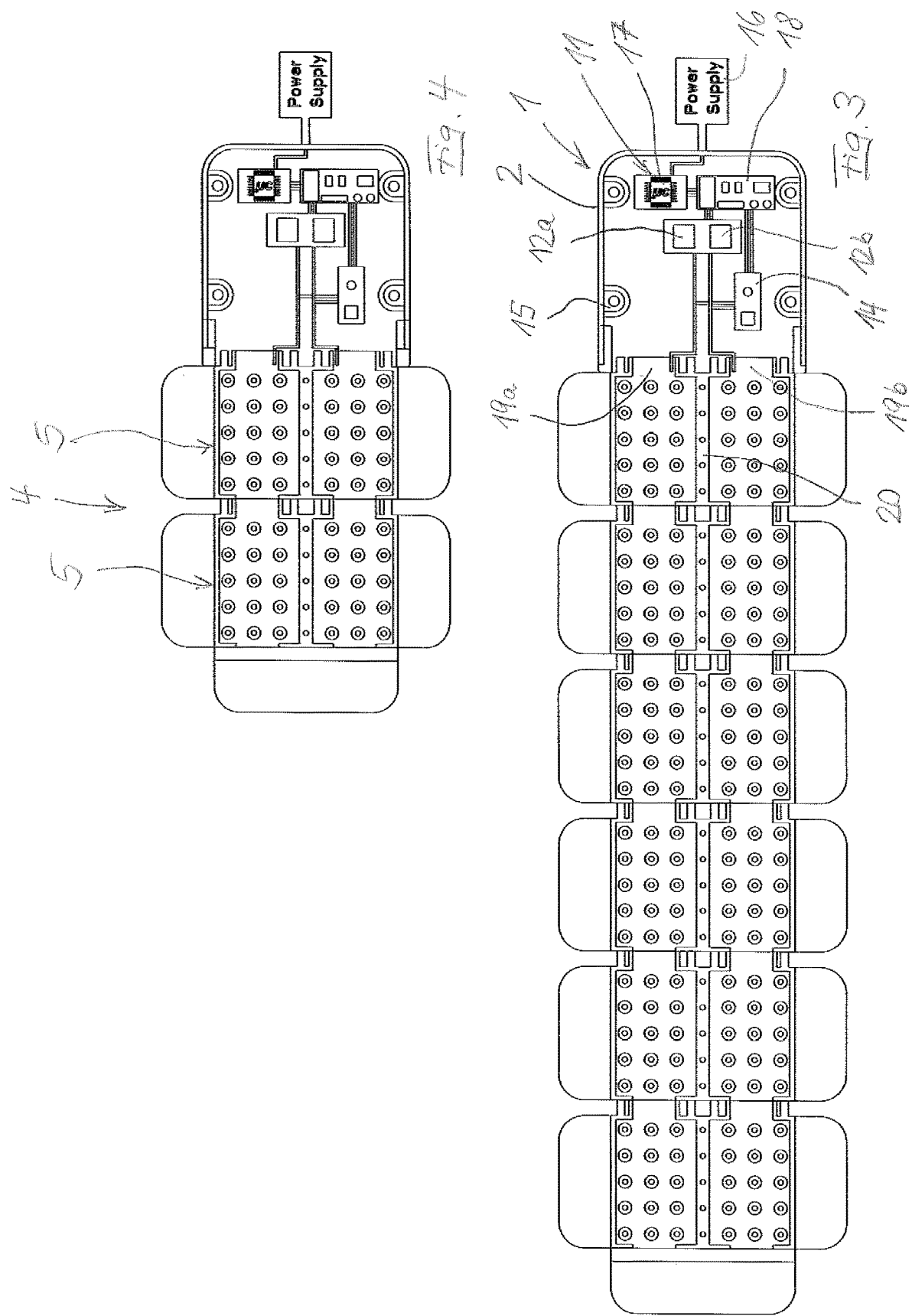

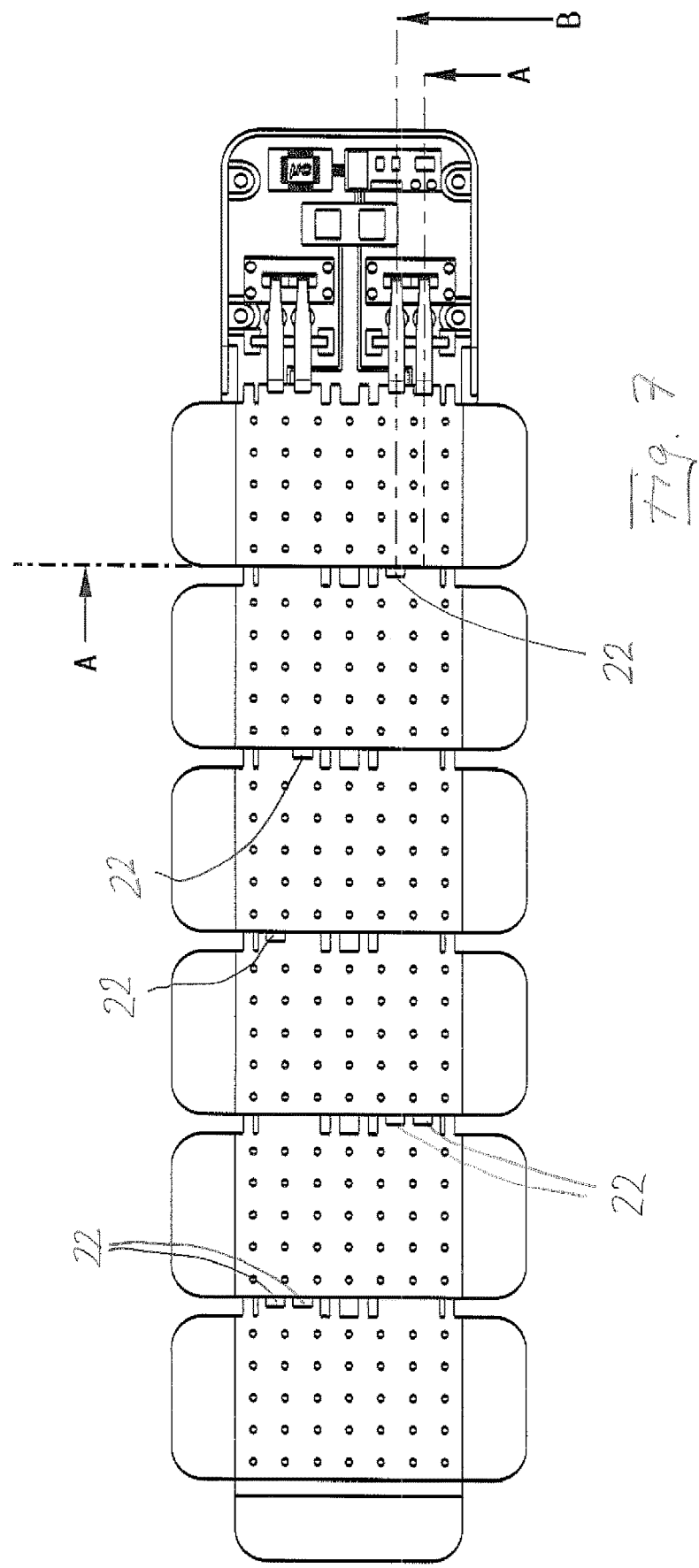

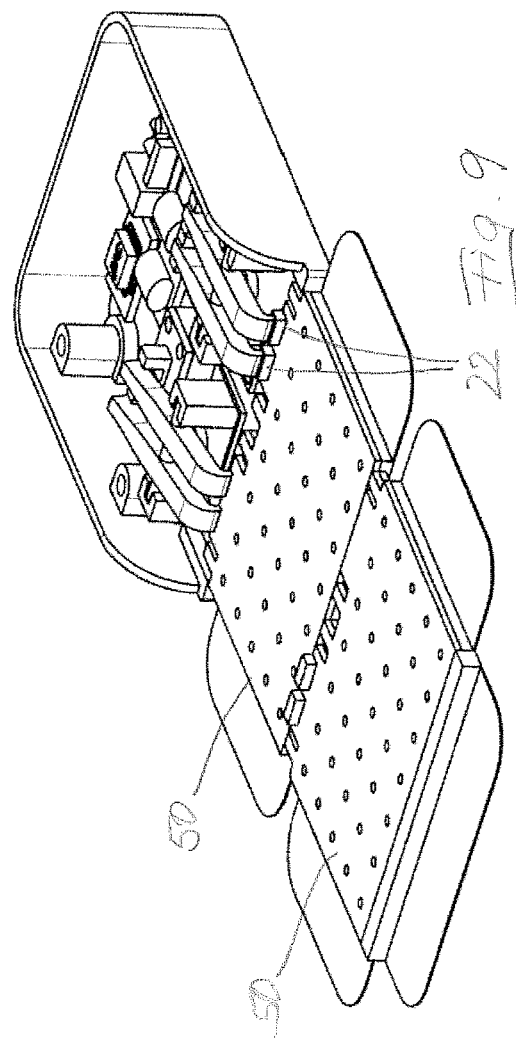
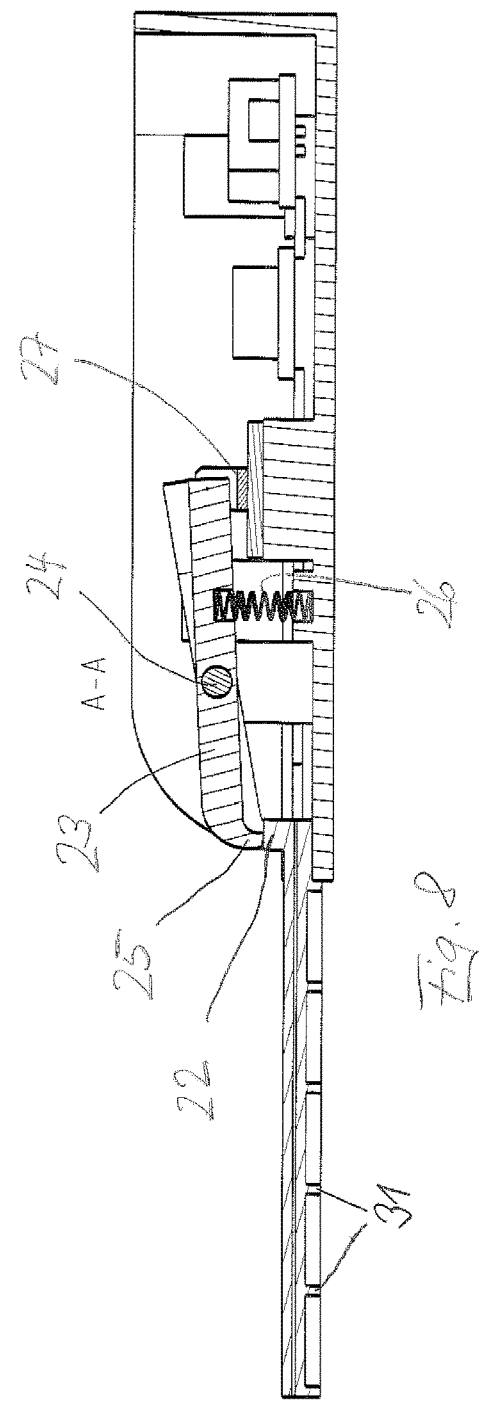

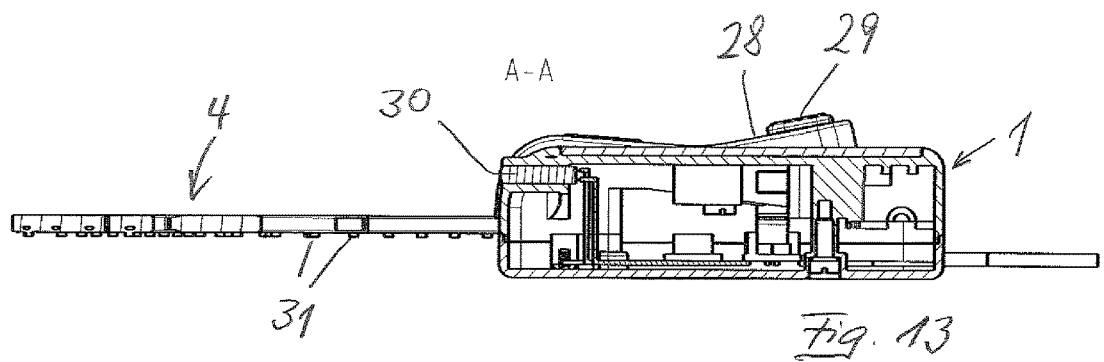
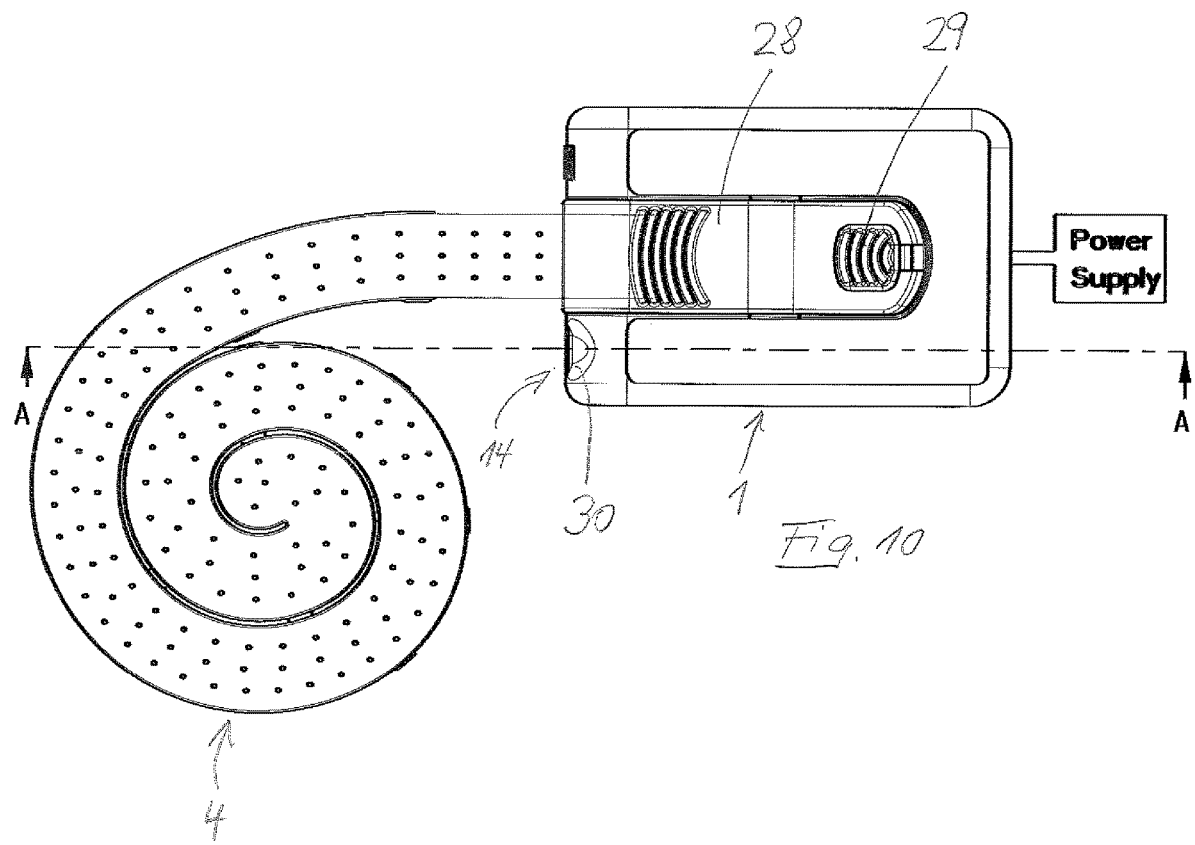

PLASMA TREATMENT ARRANGEMENT AND METHOD FOR ADAPTING THE SIZE OF A SUPPORT AREA OF THE PLASMA TREATMENT ARRANGEMENT TO THE SIZE OF THE SURFACE TO BE TREATED

The invention relates to a plasma treatment arrangement for carrying out a dielectric barrier plasma discharge on a surface to be treated, comprising a planar electrode unit that has a treatment side, and a control unit which supplies at least one electrode of the electrode unit with a high-voltage AC potential required for generating a plasma between the at least one electrode and a counter electrode that forms a reference potential, wherein the at least one electrode receiving the high-voltage AC potential is shielded by a planar dielectric at least toward the treatment side and wherein the planar electrode unit is formed to reduce the size of its contact face on the surface to be treated for the adaptation to the size of the surface to be treated.

The invention further relates to a method for adapting the size of a contact face of a planar electrode unit that has a treatment side and is part of a plasma treatment arrangement for carrying out a dielectric barrier plasma discharge on a surface to be treated, to the size of the surface to be treated, wherein a high-voltage AC potential for a power required for generating a plasma between the at least one electrode and a counter electrode that forms a reference potential is supplied to the at least one electrode of the electrode unit by means of a control unit, the at least one electrode receiving the high-voltage AC potential is shielded by a planar dielectric, at least to the treatment side, and wherein the contact face of the electrode unit is reduced for the adaptation to the size of the surface to be treated.

Plasma treatment arrangements for carrying out a dielectric barrier plasma discharge on the surface to be treated are known in numerous embodiments. A requirement here for the formation of a plasma on the surface to be treated is the supply of high-voltage AC potentials to at least one electrode of the electrode unit of the plasma treatment arrangement. In this case, the electrode unit may comprise one or more electrodes which are supplied with the AC voltage potentials, wherein either a ground electrode is provided or the surface to be treated serves as a counter electrode if the material of the surface to be treated is sufficiently conductive. An example of a counter electrode forming a reference potential is represented by the treatment on the human or animal body, which optionally as a "floating" counter electrode forms an only slightly varying reference potential.

If the electrode unit itself has the counter electrode at the reference potential, an alternating field arises between the at least one electrode driven by the high-voltage AC potential and the counter electrode, and this alternating field leads to a plasma being formed at the surface of the electrode unit. The plasma treatment obtainable in this way is less intense than when using the surface to be treated as a counter electrode.

The practice of forming the electrode units to be planar in order to facilitate a large-area treatment of a surface, wherein the electrode unit can rest directly on the surface to be treated by way of a contact face, has been known for a relatively long time. In this case, the contact face may be provided with spacers in order to define a gas space or air space for the formation of the plasma between the surface to be treated and the dielectric that shields the electrode.

For manufacturing reasons, it is uneconomical to produce numerous sizes of electrode units in order to ensure for, where possible, all sizes that come into question a good fit of the size of the electrode unit with its contact face to the surface to be treated. The problem arises in particular if the surface to be treated is a wound area on a living body since this wound area may have very different extents.

DE 10 2014 220 488 A1 has disclosed the practice of connecting different electrode units to a controller of a plasma treatment arrangement. In that case, it is possible to provide the electrode unit with a chip on which the supply with electrical signals required for this electrode unit—and optionally for a specific application—is stored. In so doing, it is also possible to take account of the relevant size of the correspondingly produced electrode unit. However, this requires electrode units being produced in advance in the various sizes, as a result of which the aforementioned disadvantages arise.

On account of these disadvantages, electrode units whose contact face can be reduced to fit the respective surface to be treated have already been disclosed. EP 2 723 447 B1 has disclosed an electrode unit which consists of a helically wound narrow stripe, in which at least one electrode extends in the longitudinal direction of the stripe. The substantially circular contact face in this case can be reduced in size by shortening the helically wound stripe by cutting off a length of the stripe that forms the outer winding(s). The remaining electrode unit is contacted in safe-to-touch fashion at the cut-off end. A similar arrangement has been disclosed by DE 10 2017 104 852 A1, in which the helically formed stripe may form a square or rectangular electrode unit and is provided with predetermined separation points, at which the length of the stripe can also be shortened by tearing. In this case, too, safe-to-touch contacting of the stripe occurs at the point of the tear.

A problem with the electrode units that are reducible in size consists in the fact that the surface power must be adapted manually following the reduction in size of the contact face of the electrode unit and depends on the experience of the operator.

The invention is therefore based on the object of facilitating an improved adaptation of the surface power, even in the case of electrode units that are reducible in size.

To achieve this object, a plasma treatment arrangement of the type set forth at the outset is according to the invention characterized in that the control unit has a device for determining the size of the fitted contact face and a control device for adjusting the power to be output to the at least one electrode on the basis of the determined size of the contact face.

The stated object is also achieved by a method of the type set forth at the outset, which is characterized in that the size of the reduced surface is determined by the control unit and the power to be supplied to the at least one electrode is adjusted accordingly on the basis of the determined size of the contact face.

The invention therefore provides for the contact face of the electrode unit to be mechanically reduced for the adaptation to the size of the surface to be treated, and then for the adaptation of the electric power guided to the electrode unit by the control unit to be provided in accordance with the reduced surface. To this end, the control unit is formed with a device for determining the size of the fitted contact face and with a control device for adjusting the power to be output accordingly to the at least one electrode such that the adaptation of the electric power that is required for the plasma generation to the contact face of the electrode unit now present is possible such that the strength of the plasma per unit area is approximately the same for all respectively set contact faces. This can prevent the case where no effective plasma arises on account of an insufficient electric power or where damage occurs on the surface to be treated on account of a plasma that is too strong, which may have painful consequences especially on body surfaces.

The control unit is preferably formed and configured such that the size of the contact face of the electrode unit is determined after the electrode unit has been connected to the control unit, in particular operationally connected to the control unit.

The size of the contact face can be determined in a number of ways, with contact face always meaning the effective contact face of the electrode unit.

If the planar electrode unit is formed as a stripe with at least one electrode of a given width extending in the longitudinal direction between a first end and a second end such that the length of the stripe determines the size of the contact face, the device for determining the size of the contact face can be, according to the invention, a detection arrangement for the length of the stripe. In this case, an electrical test signal can be output to the electrode by the control unit, said test signal being input coupled into the electrode with as few losses as possible at the first end and being reflected at the other end, the second end. In this way, a wave formed with the input frequency is superposed on a corresponding reflected wave on the electrode. By altering the frequency of the test signal, it is now possible to determine when the input coupled signal is canceled on account of the superposition with the reflected signal. In the case of the suitably chosen long output wavelength, the increase in the frequency led to a reduction in the wavelength such that the first-time cancellation of the signal represents a measure for the length of the stripe that forms the electrode unit if the frequency or the wavelength is known, since the cancellation occurs for the first time when the length of the stripe corresponds to a quarter of the wavelength (?/4). The control device consequently requires a frequency generator with which the respective frequency or wavelength is continuously adjustable. Further, a detector for the electrical signal is required in order to determine the (first-time) cancellation. The frequency or the wavelength at which the cancellation took place must be readable on the control unit. The electrical parameters for obtaining a surface power that is as constant as possible for the formation of the plasma can be set in accordance with the determined length of the stripe and the hence determined size of the contact face.

Alternatively, it is possible proceeding from the control device to capture the reduced electrode unit with a camera and to determine the size of the reduced electrode unit using an appropriate image evaluation, and to thereafter set the power supplied by the control unit.

If the electrode unit consists of a plurality of sections with electrodes that are constructed in the same way, between which predetermined separation lines are present, and so the reduction in size of the contact face is implemented by detaching one or more sections, the sections may carry different codes that are readable by the control unit using a reader. By recognizing the code of the section of the remaining electrode unit from which one or more sections have been detached, the size of the remaining electrode unit can be determined directly and can be used to drive the electrode unit. Here, the code can be formed in any manner, for example mechanically in the form of elevations or depressions, optically in the form of barcodes, QR codes, etc., magnetically using permanent magnets or formed electronically. The use of transponders in the sections, in particular, comes into question for the electronic embodiment.

The invention is intended to be explained in more detail below for a better understanding on the basis of exemplary embodiments illustrated in the drawing, which should not be construed in any way as restricting the scope of protection. In detail:

FIG. 1 shows a perspective illustration of an electrode unit formed from a plurality of identical sections, comprising a connected housing in which a power supply and a control unit are situated, FIG. 2 shows the illustration as per FIG. 1 with a removed housing top, FIG. 3 shows a plan view of the arrangement as per FIG. 2, FIG. 4 shows a plan view as per FIG. 3 on an arrangement in which a (further) shortened electrode unit is connected to the housing, FIG. 5 shows a perspective illustration as per FIG. 2 for the shortened electrode unit, FIG. 6 shows a perspective illustration analogous to FIG. 2 for a second embodiment, in which the sections of the electrode unit have different mechanical codes, FIG. 7 shows a plan view of the arrangement as per FIG. 6, FIG. 8 shows a section along the section line A-A in FIG. 7, FIG. 9 shows a perspective illustration analogous to FIG. 5 for the second embodiment, FIG. 10 shows a plan view of a housing, to which an electrode arrangement formed from a helically wound stripe is connected.

FIG. 13 shows a vertical section through the housing and the electrode arrangement along the section line A-A in FIG. 10.

Figure 5:
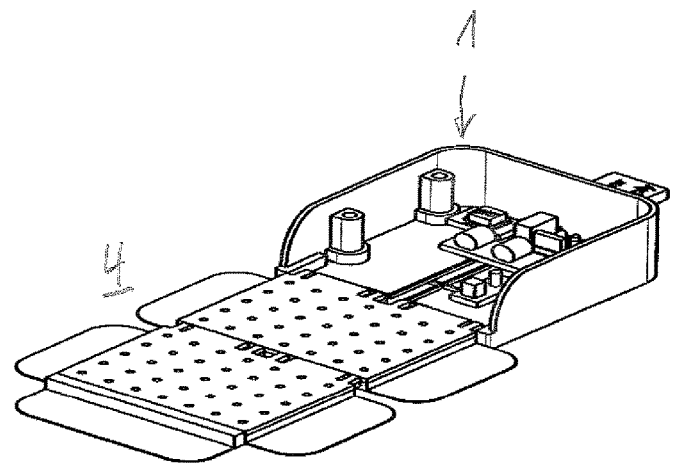

A first embodiment of a plasma treatment arrangement according to the invention is illustrated in FIGS. 1 to 5. An electrode unit 4 is connected to the housing 1, which is sealed so as to be safe to touch and consists of a housing lower part 2 and housing upper part 3, with electrical contact being established in the process. In the illustrated exemplary embodiment 6, the electrode unit 4 consists of substantially identical sections 5, which are interconnected by way of predetermined separation lines 6. The sections 5 are planar sections which are formed on their upper and lower sides by a dielectric 7, which has passage openings 8 in the illustrated embodiment. The sections 5 have a rectangular form in an exemplary embodiment and have, along their longitudinal edges 9, planar adhesive flaps 10 which are perpendicular to the predetermined separation lines 6 and which allow the electrode unit 4 to be fastened to the surface to be treated, for example the skin of a human or animal body. The section 5 furthest away from the housing 1 is provided with a further adhesive flap 10a that extends parallel to the predetermined separation lines 6.

The illustration in FIG. 2 shows the housing 1 with a removed housing upper part 3, and so only the housing lower part is visible. A control unit 11 is situated in the housing 1 and, via two high-voltage coils 12a, 12b, introduces two high-voltage signals into the electrode unit 4 via associated lines 13a, 13b. Further, a detection device 14 is situated in the housing 1 and can be used to guide an electrical signal on at least one of the lines 13a, 13b for as long as high-voltage signals are still not guided by this line 13a, 13b.

In addition to the upright side walls of the housing lower part 2, screw receptacles 15, by means of which the housing upper part 3 can be screwed onto the housing lower part, can be identified in FIG. 2.

FIG. 3 elucidates a plan view of the arrangement in the housing lower part 2 and a horizontal section through the electrode unit 4. A power supply 16, which supplies the control unit 11 in the housing 1 with voltage, is connectable to the housing 1. A microcontroller 17 generating radio frequency control pulses is situated in the control unit, the control pulses being prepared in a signal shaping stage 18 such that radio frequency pulse trains are available at the outputs of the two high-voltage coils 12a, 12b and respectively have radio frequency oscillations that are significantly damped in terms of amplitude. The repetition frequency of the pulses usually ranges between 1 kHz and 20 MHz. FIG. 3 schematically shows that the output signals of the high-voltage coils 12a, 12b, which are secondary coils of a high-voltage transformer, are each connected to a partial electrode 19a, 19b of an electrode 19. The partial electrodes extend with mirror symmetry in relation to a center line 20 of the sections 5 in the longitudinal direction of the electrode unit 4. The width of the partial electrodes 19a, 19b is in each case reduced in stepped fashion in the region of the predetermined separation lines 6. The partial electrodes 19a, 19b are provided with openings 21 circular openings in this case which are flush with the passage openings 8 of the dielectric but have a greater diameter such that the passage openings 8 of the dielectric extend through the electrode 19 and form a passage channel, which even level with the electrode 19 has a wall that is formed by the dielectric 7. This ensures that a fluid, in particular a liquid, can be guided through the passage openings without the liquid coming into contact with the electrode 19. Consequently, the electrode unit 4 is also suitable for placement on a wound on a human or animal skin, with wound secretions being able to be drained through the passage openings.

The electrode 19 which—as illustrated—may be formed by two or more partial electrodes 19a, 19b is embedded in the dielectric 7 and therefore shielded in a manner safe to touch, in particular toward the surface to be treated. The supply of the electrode with the radio frequency high-voltage potentials leads to the formation of a high-voltage field between the electrode 19 and the surface to be treated, which acts as a counter electrode (ground electrode). The two partial electrodes 19a and 19b are supplied with equal and opposite high-voltage signals, which lead to an aggregate signal of zero. By way of example, this can be effected by virtue of the two high-voltage coils 12a, 12b being driven by identical control signals but being wound in the opposite sense such that signals with opposite polarities form at the output of the two coils. This leads to an amplification of the plasma field in the region of the partial electrodes while the fields are already compensated at some distance such that an impairment of the surroundings by radio frequency signals is significantly reduced.

Naturally, forming the electrode 19 with two partial electrodes is advantageous in many cases but it is not mandatory for the implementation of the invention. The latter can also be implemented by a single piece electrode 19.

Further, it is possible for the partial electrodes to be driven such that one partial electrode receives a radio frequency AC voltage signal while the other electrode forms a counter electrode as a ground electrode. This embodiment is expedient if the surface to be treated is not suitable as a counter electrode on account of the material of the body with the surface, for example because there is a lack of the required conductivity. In this case, the partial electrodes need not necessarily be arranged next to one another, as illustrated in FIG. 3, but may also be layered in relation to one another in an arrangement known per se such that there is a dielectric layer between the two electrodes.

FIG. 4 shows an arrangement in which the electrode unit 4 is formed only by two connected sections 5 such that the electrode unit 4 has a significantly smaller contact area of the surface to be treated (not illustrated) in relation to the electrode unit 4 of FIG. 3.

So that the control unit does not supply the smaller electrode unit 4 of FIG. 4 with the same electric power as a large electrode unit 4 as per FIG. 3, the size of the contact surface is determined by means of the detection device 14 when the electrode unit 4 is connected to the control unit 11 in the housing 1. To this end, the detection device 14 guides an electrical signal on at least one of the partial electrodes 19a, 19b. The electrical signal of the detection device 14 is reflected at the free end of the partial electrodes 19a, 19b, that is to say at the end-side distant section 5, and so there is a superposition of the transmitted signal and the reflected signal. The detection device 14 can be designed such that it emits a continuous harmonic electrical signal, the frequency (wavelength) of which is adjustable. Then, the frequency is adjusted such that a first-time cancellation of the aggregate signal is detectable. The cancellation is implemented when the length of the electrode unit 4 corresponds to a quarter wavelength. Consequently, the length of the electrode unit 4 can be determined by way of the wavelength set when the aggregate signal is canceled for the first time. Since the length of the electrode unit 4 is proportional to the contact face in the illustrated electrode unit 4, the amplitude of the control signal and hence the electrical power available for the plasma field can be set on the basis of the size of the contact face by the microcontroller 17 as control device of the control unit 11.

Accordingly, the electrode unit 4 of FIG. 4 is supplied with a different electrical power from that supplying the electrode unit 4 as per FIG. 3. The arrangement arising for the small electrode unit 4 as per FIG. 4 is elucidated in a perspective illustration in FIG. 5.

It is evident to a person skilled in the art that the illustrated external power supply 16 is not mandatory. It is also possible to set up a stand-alone power supply in the housing which is fed by rechargeable or non-rechargeable batteries, with the radio frequency AC voltage signals being generated in a manner known per se by a chopper or an oscillation circuit driven in pulse-type fashion. Further, it is possible to already supply the control unit 11 with high-voltage signals, but this requires the use of high-voltage-safe lines.

In a second embodiment of the invention, which is illustrated in FIGS. 6 to 9, the electrode unit 40 once again consists of substantially identical sections 50, which may be constructed in the same way as the sections 5 of the first embodiment. A difference merely consists in the fact that the sections 50 each have a different mechanical code 22 at their respective front edge, which is optionally adjacent to a predetermined separation line 6. The mechanical code arises from the presence or lack of presence of an elevation at four specified positions of the respective front edge of the sections 50. Sensing levers 23 in the housing 1 interact with these mechanical codes 22. The position of the sensing levers is recognized by the detection device 14, which can consequently determine which section 50 is in contact with the control unit 11 in the housing 1. The electrode unit 40 was shortened by detaching at least one section 50 at the end of the electrode unit 4 that is opposite to the section 50 with the end-side adhesive flap 10*a*. Consequently, the length of the remaining electrode unit 40 can be determined by identifying the section 50 which is in contact with the control unit 11 in the housing 1. Accordingly, the control unit 11 controls the electrical power that is guided to the electrode 19. The electrode 19 is illustrated as a single electrode in this embodiment. Naturally, an electrode 19 may also be formed from two or more partial electrodes 19*a*, 19*b* in this embodiment.

As elucidated in FIGS. 7 to 9, the sensing levers 23 interacting with the mechanical codes 22 are two-arm levers which are mounted so as to be pivotable about a common axis and which have a downwardly offset sensing tip 25 directed at the electrode unit 40. By way of a compressive spring 26 attached from below beyond the pivot 24, the sensing tip 25 is pressed downward onto the face of the section 50 pushed into the housing 1. Only the sensing lever 23 or the sensing levers 23, for which a mechanical code 22 is present on the section 50, is/are lifted at the sensing tip 25, as elucidated in FIG. 8 and FIG. 9.

Figure 6:
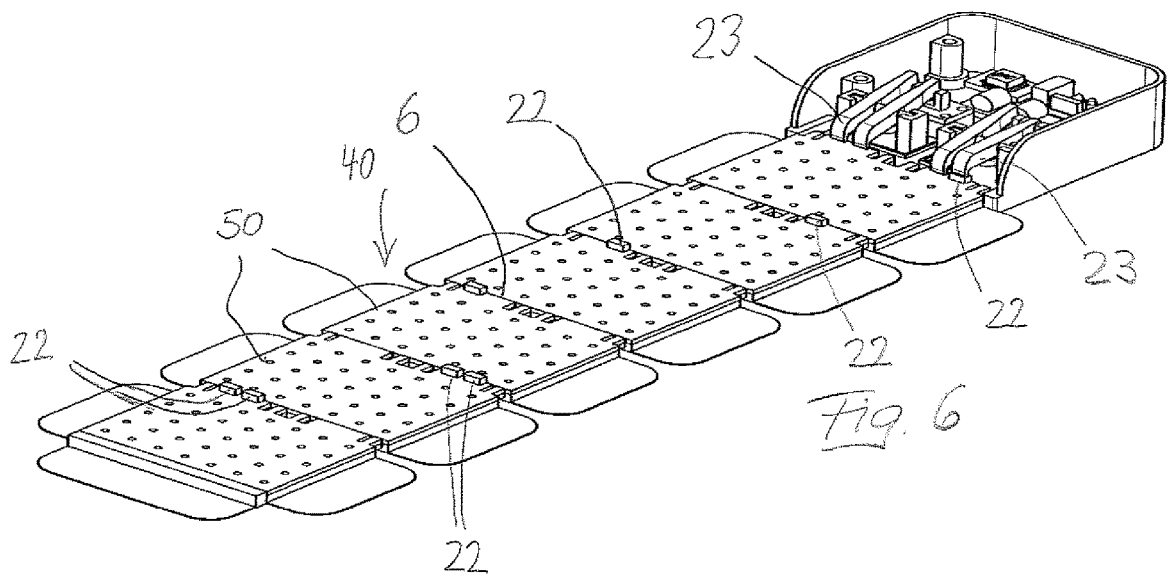
Figure 11:
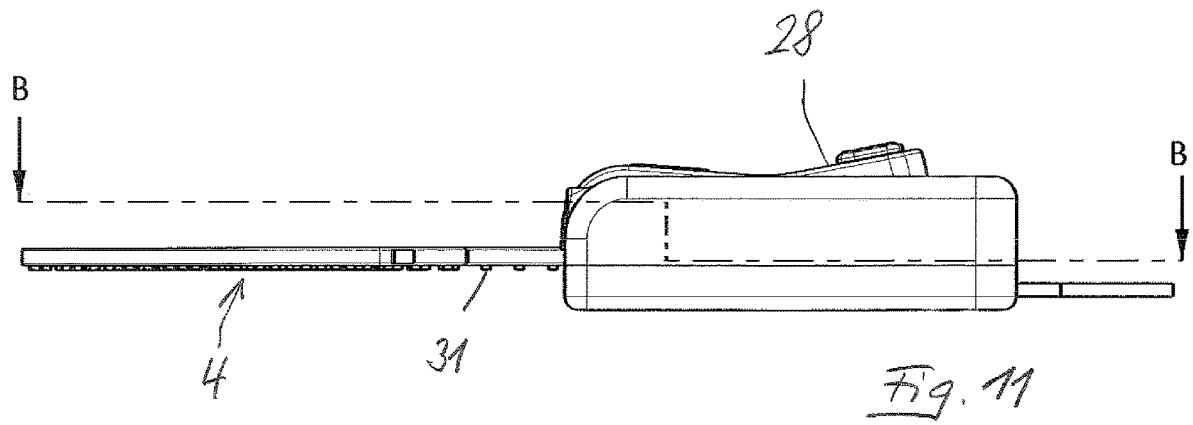
FIG. 11 shows a side view of the arrangement as per FIG. 10.

It is evident from the comparison of FIGS. 6 and 9 that the long electrode unit 4 of FIG. 6 is encoded by virtue of only the sensing lever 23 situated to the right in FIG. 6 being lifted, while for the short electrode unit the code which is situated on the penultimate section 50 in FIG. 6 and which has two elevations for the two right sensing levers 23 is effective if the electrode unit 4 only consists of the two last sections 50.

Lifting of the sensing tips 25 and hence the change in the position of the sensing lever 23 can be detected in conventional fashion, for example by establishing contact at the lever arm distant from the sensing tip 25. The detection by means of a photoelectric barrier 27, as indicated in FIG. 8, is also possible. If only a single photoelectric barrier is present, the interruption of the light beam by one of the levers may also indicate that contact has been established between the control unit 11 in the housing 1 and the electrode unit 4 in order to determine the size at this instant before a high-voltage signal is guided to the electrode 19.

What is essential within the scope of the present invention is the determination of the size of the electrode unit 4 during or immediately following the establishment of contact between the electrode unit 4 and the control unit 11 on the housing 1.

In a third embodiment of the invention, which is illustrated in FIGS. 10 to 13, the electrode unit 4 is formed as a helically wound stripe which can be cut at any point in order thus to reduce the usable contact face of the electrode unit 4. The end of the stripe from which a piece has been cut off is inserted into a receiving slot of the housing 1 and can be contacted there by means of a rocker 28, for example by virtue of a metallic cutting contact of the rocker cutting through the dielectric 7 and establishing a conductive contact with the electrode 19 within the dielectric 7. The rocker can be locked by means of a slider 29 such that a high-voltage-safe connection is rendered possible. The housing 1 can be provided with a control unit 11 in the same way as the housing 1 in the above-described embodiments.

Naturally, the exemplary illustrated form of the electrode unit 4 is not a precondition for the third embodiment since other electrode forms, for example with a linear stripe extending in a straight line, are possible as an electrode unit.

A camera 30 is provided in the housing 1 as a detection device 14, said camera being directed at the surface of the electrode unit 4 such that the size of the connected electrode unit 4 is determinable by means of image evaluation. It is also essential to this end that the size of the electrode unit 4 is determined after contact with the control unit 11 in the housing 1 has been established.

Figure 12:
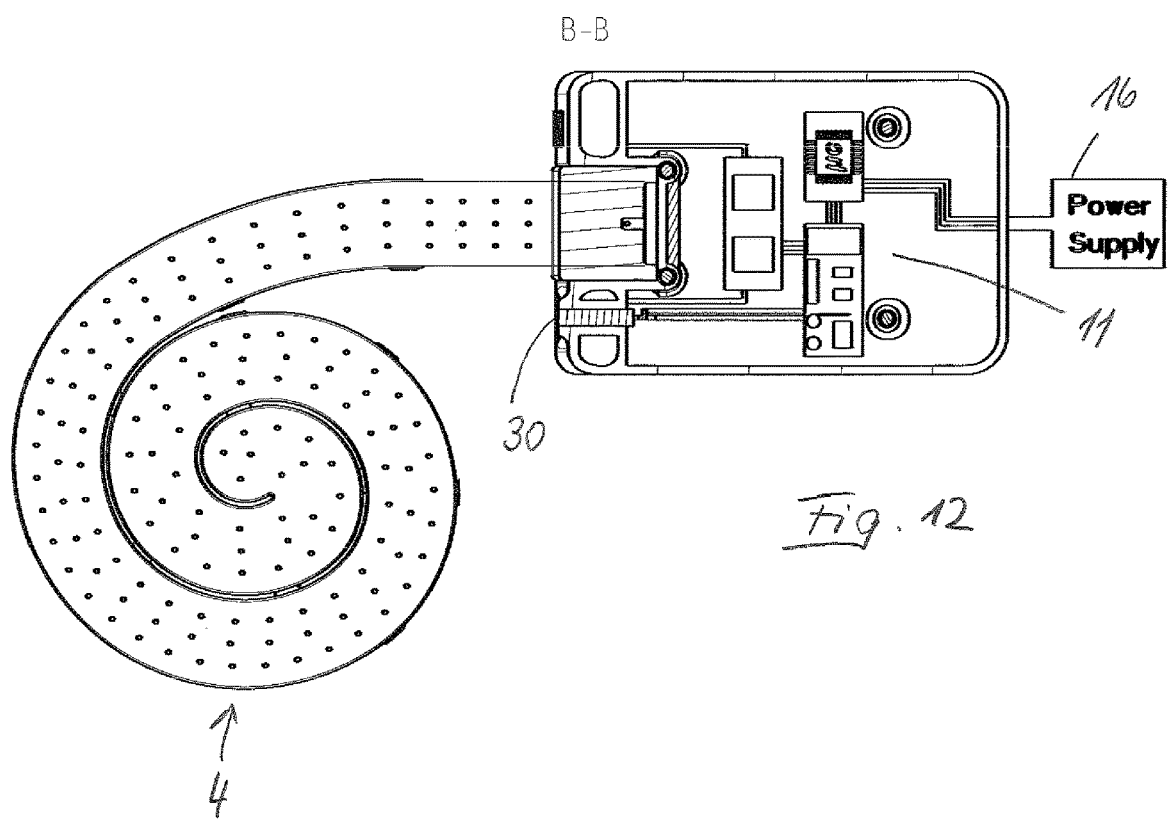
FIG. 12 shows a horizontal section through the housing along the section line B-B in FIG. 11.

In all exemplary embodiments, the electrode unit 4 can be provided with spacer projections 31 formed into the dielectric 7 on its contact face facing the surface to be treated, as a result of which gas spaces in which the dielectric barrier discharge plasma can form are kept clear upon contact with the surface to be treated. FIGS. 12 and 13 elucidate the arrangement of the camera 30 above the upper side of the electrode unit 4.

It is readily possible to identify that the illustrated exemplary embodiments are respectively combinable in respect of the form of the utilized electrode unit 4 and in respect of the utilized detection devices 14, and that a restriction to the respectively illustrated combination is neither intended nor indicated. The same applies to the embodiment of the housing 1 and the way of establishing contact between the electrode unit 4 and the control unit 11 in the housing 1, which can be implemented in any conventional fashion.

LIST OF REFERENCE SIGNS

1 Housing
2 Housing lower part
3 Housing upper part
4 Electrode unit
5 Sections
6 Predetermined separation lines
7 Dielectric
8 Passage openings
9 Longitudinal edges
10, 10*a* Adhesive flaps
11 Control unit
12*a,b* High-voltage coils
13*a,b* Lines
14 Detection devices
15 Screw receptacles
16 Power supply
17 Microcontroller
18 Signal shaping stage
19*a,b* Partial electrodes
20 Center line
21 Openings
22 Mechanical code
23 Sensing lever
24 Pivot
25 Sensing tip
26 Compressive spring
27 Photoelectric barrier
28 Rocker
29 Slider
30 Camera
31 Spacer projections

The invention claimed is:

1. A plasma treatment arrangement for carrying out a dielectric barrier plasma discharge on a surface to be treated, comprising:
   at least one planar electrode unit comprising a treatment side and the at least one planar electrode unit establishing a contact face directed towards the treatment side;
   a control unit which supplies at least one electrode of the at least one planar electrode unit with a high-voltage alternating current (AC) potential for generating a plasma between the at least one electrode and a counter electrode that forms a reference potential, wherein the at least one planar electrode unit receiving the high-voltage AC potential is shielded by a planar dielectric at least toward the treatment side, and wherein the at least one planar electrode unit is formed so as to allow a reduction of its contact face that is positionable on the surface to be treated to a fitted contact face adapted to a size of the surface to be treated, wherein the control unit comprises a sensor which senses a size of the fitted contact face, and a controller controlling a power to be output to the at least one electrode based on the size of the fitted contact face.

2. The plasma treatment arrangement as claimed in claim 1, wherein the at least one electrode of the at least one planar electrode unit is formed as a stripe of a given width extending in a longitudinal direction between a first end and a second end, wherein a length of the stripe determines the size of the fitted contact face, and wherein the sensor senses the size of the fitted contact face contains a detection arrangement for the length of the stripe.

3. The plasma treatment arrangement as claimed in claim 2, wherein the detection arrangement is configured for utilizing an electrical test signal transported on the at least one electrode.

4. The plasma treatment arrangement as claimed in claim 3, wherein the at least one electrode is formed to reflect, at the second end, the electrical test signal which is coupled in at the first end.

5. The plasma treatment arrangement as claimed in claim 4, wherein the detection arrangement comprises a frequency generator designed to generate the electrical test signal, an adjustment device for continuously adjusting a frequency of the electrical test signal, and a detector which detects an amplitude of the electrical test signal.

6. The plasma treatment arrangement as claimed in claim 5, wherein the frequency generator generates electrical test signal as a harmonic wave train.

7. The plasma treatment arrangement as claimed in claim 1, wherein the control unit further comprises a camera arrangement with at least one camera and an evaluation device for determining at least one of a length and an area of the at least one planar electrode unit.

8. The plasma treatment arrangement as claimed in claim 1, wherein the at least one planar electrode unit is comprised of a plurality of sections with electrodes that are constructed in a same way, wherein between the electrodes are predetermined separation lines, and wherein a reduction in size of the contact face is implemented by detaching one or more of the plurality of sections.

9. The plasma treatment arrangement as claimed in claim 8, wherein each of the plurality of sections carry different codes, wherein the control unit comprises a reader for reading the different codes, and wherein a connection between the at least one planar electrode unit and the control unit is on a section from which one or more sections of the plurality of sections were detached.

10. The plasma treatment arrangement as claimed in claim 2, wherein the at least one planar electrode unit is comprised of a plurality of sections with electrodes that are constructed in a same way, wherein between the electrodes are predetermined separation lines, and wherein a reduction in size of the contact face is implemented by detaching one or more of the plurality of sections.

11. The plasma treatment arrangement as claimed in claim 10, wherein each of the plurality of sections carry different codes, wherein the control unit comprises a reader for reading the different codes, and wherein a connection between the at least one planar electrode unit and the control unit is on a section from which one or more sections of the plurality of sections were detached.

* * * * *